UNITED STATES PATENT OFFICE.

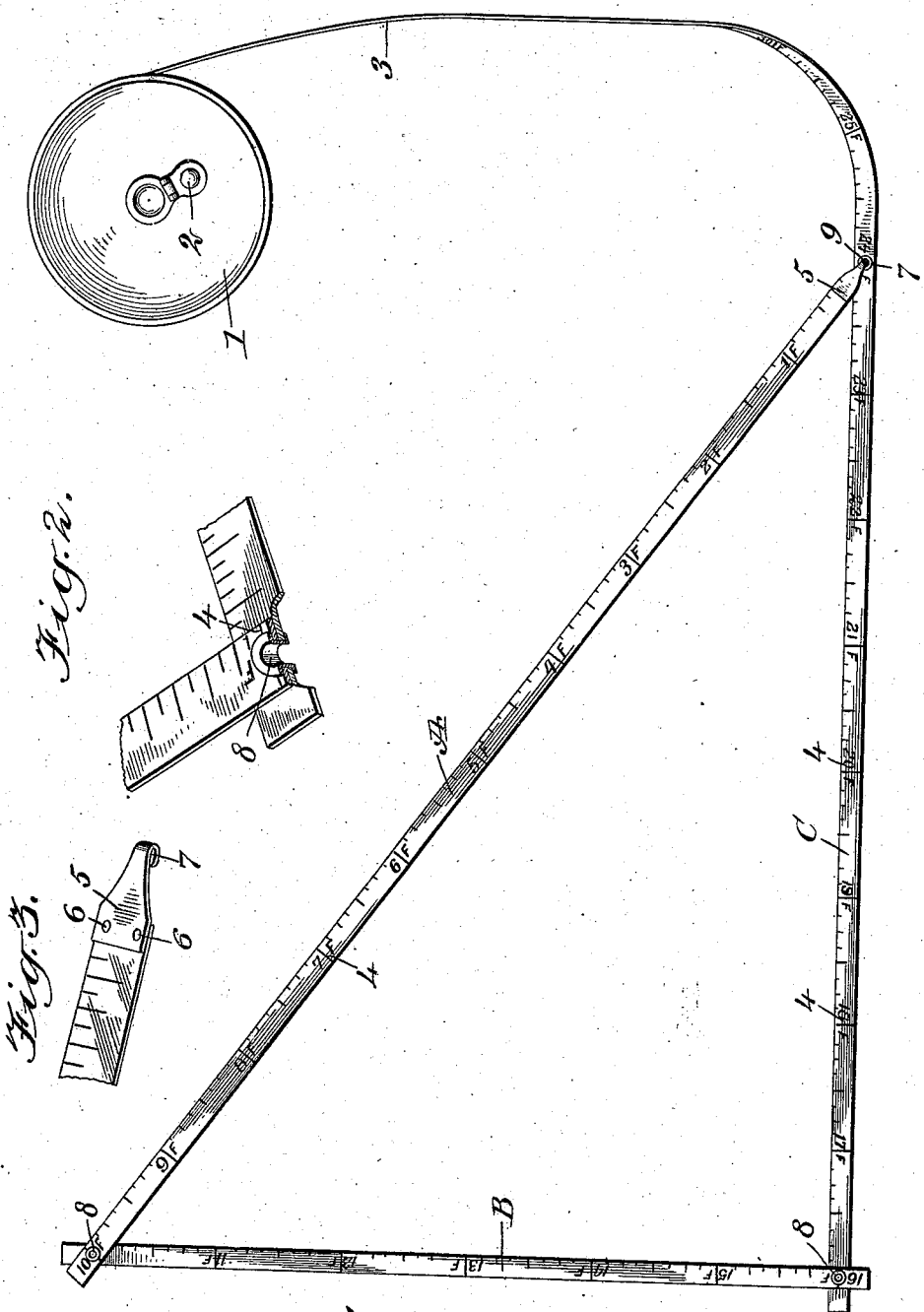

WILLIAM J. DE LASHMUTT, OF ASTORIA, OREGON.

RULE.

No. 884,904.　　　　Specification of Letters Patent.　　　Patented April 14, 1908.

Application filed October 28, 1907. Serial No. 399,559.

*To all whom it may concern:*

Be it known that I, WILLIAM J. DE LASHMUTT, a citizen of the United States, and a resident of Astoria, in the county of Clatsop and State of Oregon, have invented a new and Improved Rule, of which the following is a full, clear, and exact description.

This invention relates to rules, and more particularly to flexible rules such as tape measures.

An object of the invention is to provide a simple, strong and inexpensive rule, by means of which a right angle with respect to any line can be easily determined.

A further object of the invention is to provide a flexible rule comprising jointed sections which are proportioned to permit the arrangement of the sections into a triangle of predetermined angularity.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which Figure 1 is a plan view of my invention showing certain of the rule sections formed into a right-angled triangle; Fig. 2 is a perspective view of a joint of the rule showing parts in transverse section; and Fig. 3 is a perspective view of the extremity of the rule showing a detail.

Before proceeding to a more detailed explanation of my invention, it should be understood that it answers the purposes of an ordinary rule such as a tape measure, folding rule and the like. At the same time it provides means for laying off a line at right angles to any other line or for determining a line at some other angle with a known line.

While the invention is particularly applicable to flexible rules such as tape measures it can also be used with rules of a different character; for instance, with wooden or steel folding rules and the like. It is often necessary to lay off a line at right-angles to some other line, without having recourse to a square or other instrument for the purpose, or when an ordinary rule alone is available.

My invention provides means not only for laying off lines at right angles, but also for determining lines of different angularity with respect to other lines and for this purpose the assistance of no other instrument, such as a square, is necessary.

Referring more particularly to the drawings, 1 represents a rule casing of the ordinary construction and serving to contain a tape measure when the latter is rolled up. The casing has the usual crank arm 2 by means of which the rule can be rolled up into the casing. The rule 3 in the form of the device illustrated in the drawings herewith, may be formed of any suitable material such as steel, fabric or the like and is graduated into units, the unit marks 4 indicating feet, being designated by corresponding numbers and the letter F. The spaces between the feet marks are subdivided into fractions of a foot.

The body of the rule 3 consists of a plurality of sections, the end section A and the two adjacent sections B and C respectively, consisting, in the form of the device illustrated, of lengths of ten, six and eight feet, respectively. At the extremity of the rule the section A has a plate member 5 secured thereto by means of rivets 6. The end of the plate is tapered and formed into a hook 7 for a purpose which will appear hereinafter.

The sections A, B and C are pivotally secured together by means of eye-rivets 8 or in any other suitable manner. The section C may be jointed to the body of the rule or may consist of an extension thereof, being separated from the body of the rule by an eyelet 9 similar in form to the eye-rivets 8 and adapted to receive the hook 7.

By arranging the sections A, B and C as shown in Fig. 1, a right-angled triangle is formed, and by means of this triangle a line at right-angles to any other line can be determined. Similarly lines at angles with other lines corresponding to the hypotenuse angles of the triangles, can be laid off. The sides of the triangle, that is, the sections A, B and C may be of any length, provided they are proportioned respectively to the numbers 3, 4 and 5, for it is a well-known mathematical principle that a triangle having sides the length of which are so porportioned, is a right-angled triangle.

The plate 5 is so formed, and is mounted upon the end of the rule in such a manner, that the length of the end sub-division of the section extends to the hook 7. The eye-rivets 8 are so arranged that the adjacent sub-division marks of the joint sections pass through the center of the eyelet; then, when the sections A, B and C are arranged to form the triangle the lengths of the sides of the latter are truly proportioned. The eye-rivets also serve to permit the inserting therethrough of nails or other implements for holding the triangle in position.

It will be understood that the sections A, B and C can be proportioned to form a triangle other than a right-angle triangle, for instance, an equi-lateral triangle; that is, one in which the respective angles are all of 60°.

Having thus described my invention, I claim as new and desire to secure by Letters Patent:

A rule comprising a flexible band divided adjacent to one end into a plurality of sections, eye-rivets connecting the sections, the free end of the outermost section being provided with a hook for engaging the eye-rivet connecting the innermost section with the band, said sections being proportioned to form a predetermined triangle when the said sections are arranged each in a straight line and the end of the outermost section connected with the eye-rivet connecting the innermost section with the band.

In testimony whereof I have signed my name to this specification in the presence of two subscribing witnesses.

WILLIAM J. DE LASHMUTT.

Witnesses:
  A. M. SMITH,
  ISABELLA PAULSEN.